US012722733B2

(12) United States Patent
Yamada

(10) Patent No.: US 12,722,733 B2
(45) Date of Patent: Sep. 1, 2026

(54) RIDER-ASSISTANCE SYSTEM, DATA STRUCTURE, AND CONTROL METHOD

(71) Applicant: Robert Bosch GmbH, Stuttgart (DE)

(72) Inventor: Yasuo Yamada, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 173 days.

(21) Appl. No.: 18/722,980

(22) PCT Filed: Nov. 30, 2022

(86) PCT No.: PCT/IB2022/061588

§ 371 (c)(1), (2) Date: Jun. 21, 2024

(87) PCT Pub. No.: WO2023/119024

PCT Pub. Date: Jun. 29, 2023

(65) Prior Publication Data

US 2026/0001611 A1 Jan. 1, 2026

(30) Foreign Application Priority Data

Dec. 23, 2021 (JP) ................................ 2021-209162

(51) Int. Cl.

*B62J 50/22* (2020.01)
*B62J 45/20* (2020.01)
*G08G 1/01* (2006.01)

(52) U.S. Cl.

CPC ............... *B62J 50/22* (2020.02); *B62J 45/20* (2020.02); *G08G 1/0112* (2013.01)

(58) Field of Classification Search

None

See application file for complete search history.

(56) References Cited

U.S. PATENT DOCUMENTS 9,043,106 B2 * 5/2015 Ingram ............... B60W 30/143 701/423
11,161,508 B2 * 11/2021 Uchida .................... G08G 1/09
(Continued)

FOREIGN PATENT DOCUMENTS

CN 120544294 A * 8/2025 ............ B60T 8/1706
DE 102017220421 A1 * 5/2019 ............ B60W 10/20
(Continued)

OTHER PUBLICATIONS

International Search Report and Written Opinion for Application No. PCT/IB2022/061588 dated Feb. 27, 2023 (10 pages).

*Primary Examiner* — Kevin R Steckbauer
(74) *Attorney, Agent, or Firm* — Michael Best & Friedrich LLP

(57) ABSTRACT

The present invention obtains a rider-assistance system, a data structure, and a control method capable of improving safety of a straddle-type vehicle.

In a rider-assistance system 1, the data structure, and the control method according to the present invention, an execution section of the rider-assistance system 1 executes rider-assistance operation to assist with driving by a rider. Furthermore, a generation section of the rider-assistance system 1 generates travel guide information on a curved road by subjecting a data set, which includes turning travel information of each of plural straddle-type vehicles 10 on the curved road acquired by each of the vehicles, to statistical processing. Before the straddle-type vehicle 10 enters the curved road, the execution section executes the rider-assistance operation on the basis of the travel guide information that is generated by the generation section.

7 Claims, 5 Drawing Sheets

(56) References Cited

U.S. PATENT DOCUMENTS

| | | | | |
|---|---|---|---|---|
| 2013/0261914 | A1* | 10/2013 | Ingram | B60W 30/143<br>701/423 |
| 2017/0158195 | A1* | 6/2017 | Uchida | B60W 30/143 |
| 2017/0247042 | A1 | 8/2017 | Seidl | |
| 2026/0001611 | A1* | 1/2026 | Yamada | B62J 50/22 |

FOREIGN PATENT DOCUMENTS

| | | | | | |
|---|---|---|---|---|---|
| EP | 1679673 | A1 | * | 7/2006 | B62J 45/4151 |
| EP | 1679673 | B1 | * | 4/2011 | B62J 45/4151 |
| EP | 3185231 | A1 | * | 6/2017 | B62J 27/00 |
| EP | 3185231 | B1 | * | 3/2019 | G08G 1/09 |
| EP | 4456034 | A1 | * | 10/2024 | B62J 45/20 |
| JP | 2009023655 | A | * | 2/2009 | B62J 45/4151 |
| JP | 2009116882 | A | | 5/2009 | |
| JP | 2015194939 | A | * | 11/2015 | |
| JP | 2017187812 | A | * | 10/2017 | B62J 45/4151 |
| JP | 7719881 | B2 | * | 8/2025 | B62J 45/20 |
| WO | WO-2005038745 | A1 | * | 4/2000 | B62J 45/4151 |
| WO | WO-2005038746 | A1 | * | 4/2005 | B62J 45/4151 |
| WO | WO-2005038747 | A1 | * | 4/2005 | B62J 45/4151 |
| WO | WO-2016027640 | A1 | * | 2/2016 | B60W 40/072 |
| WO | 2020100334 | A1 | | 5/2020 | |
| WO | WO-2023119024 | A1 | * | 6/2023 | B62J 45/20 |

* cited by examiner

[FIG. 1]
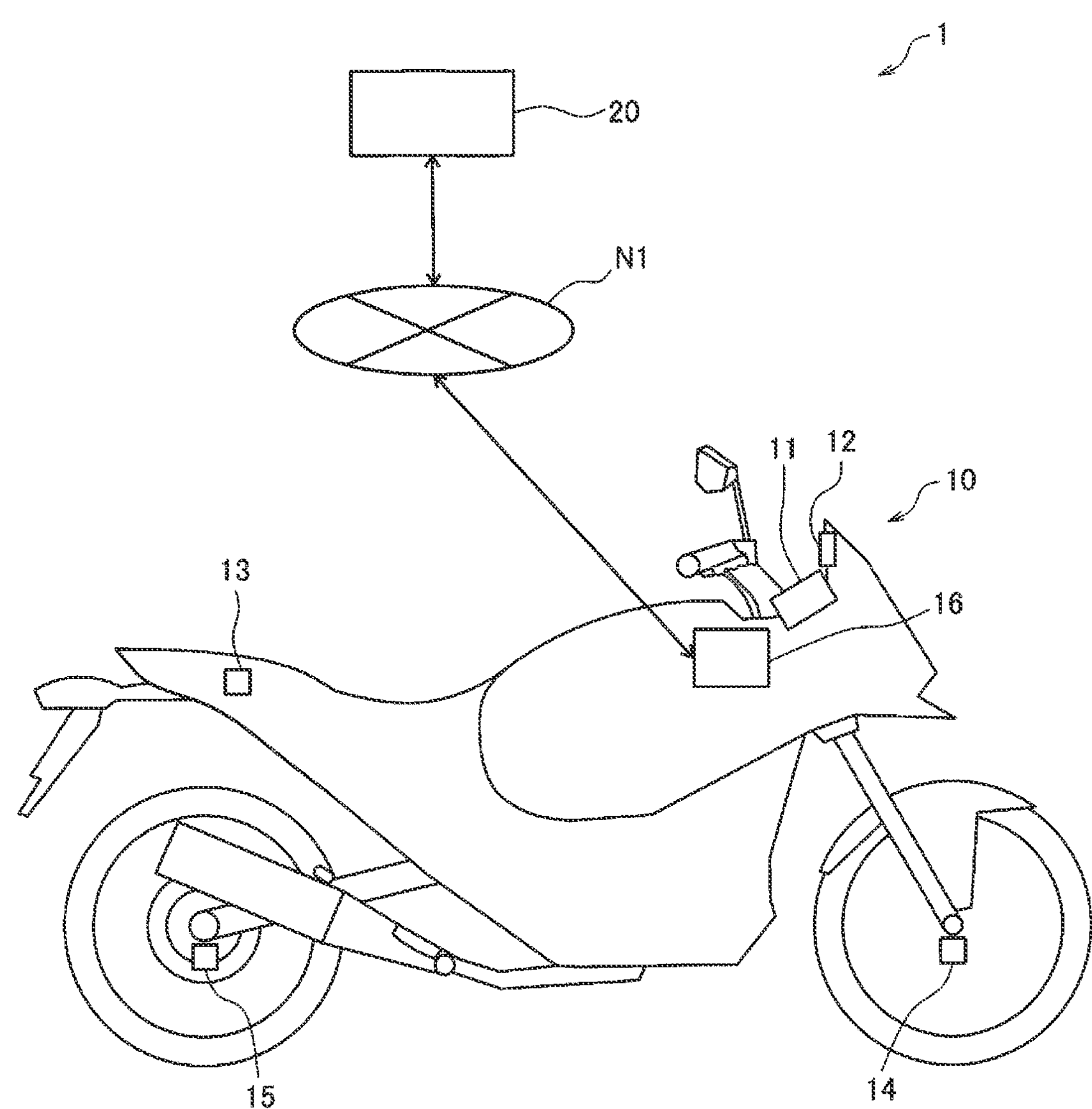

[FIG. 2]
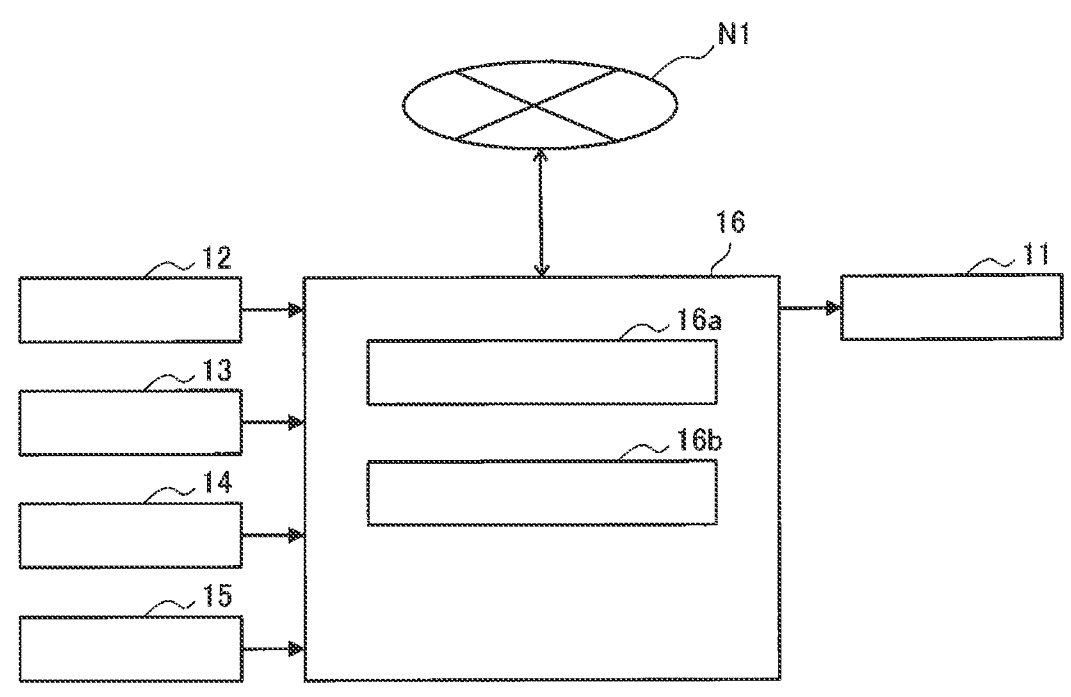
[FIG. 3]
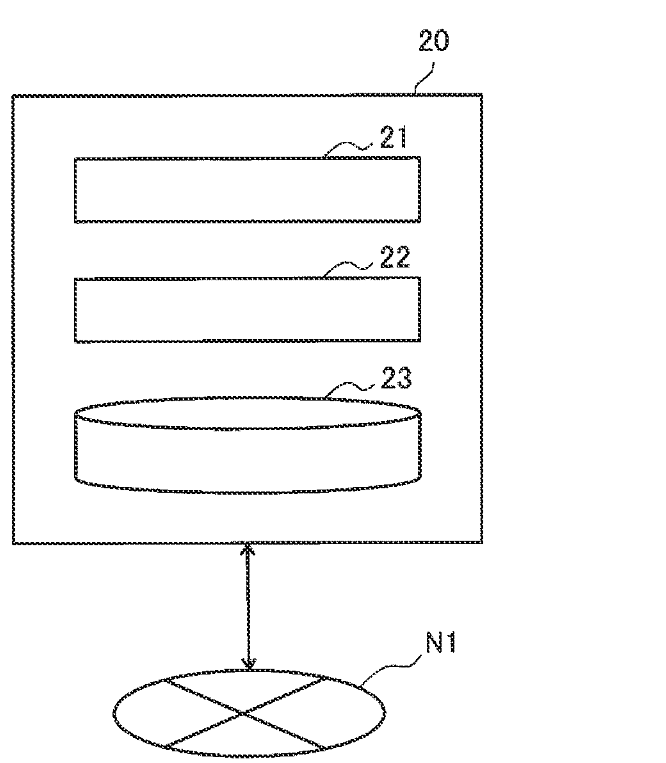

[FIG. 4]
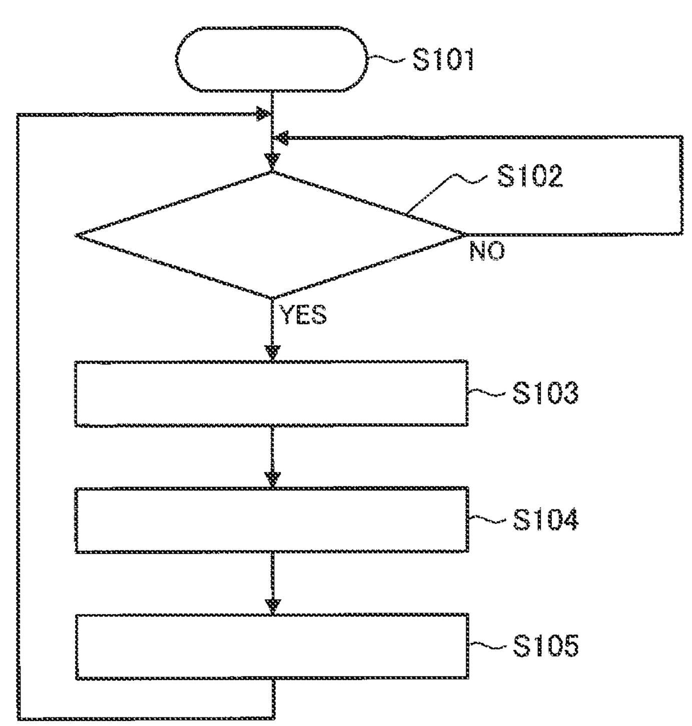

[FIG. 5]
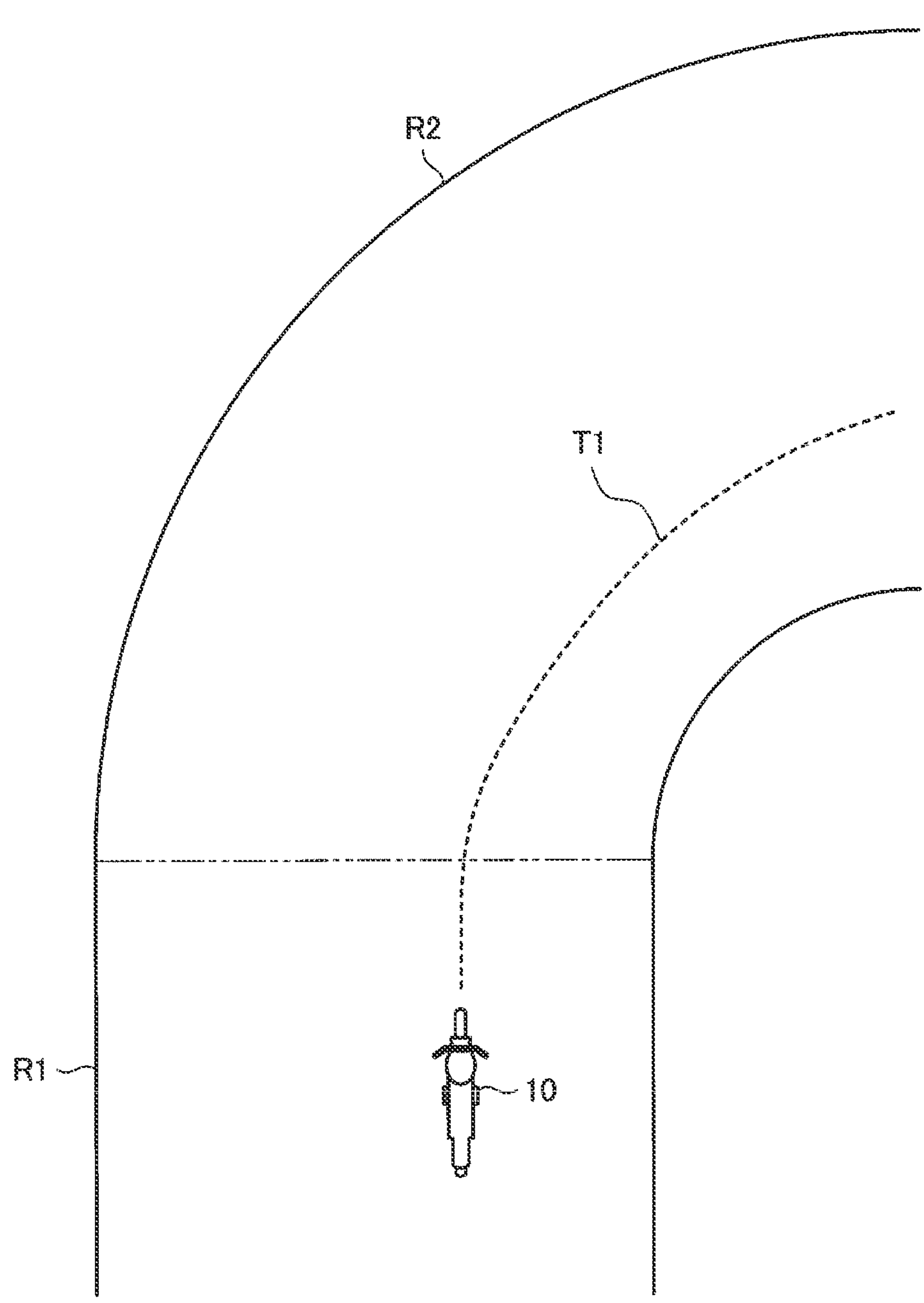

[FIG. 6]
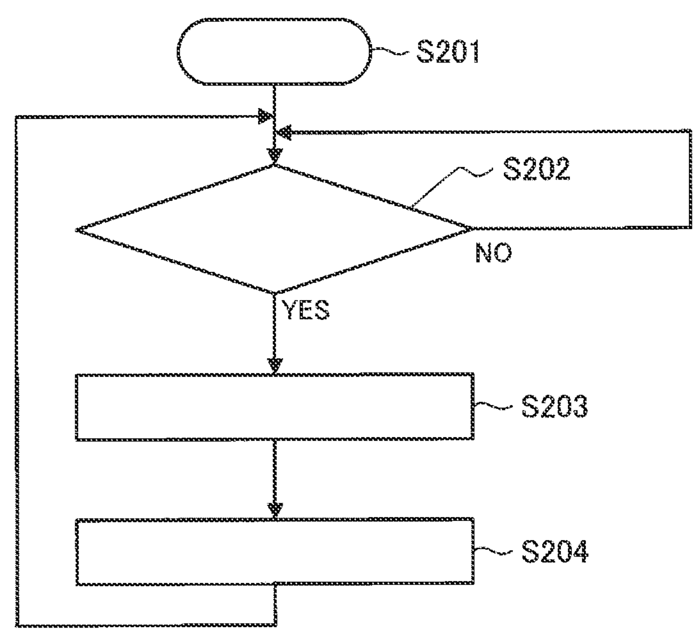
[FIG. 7]
D1
| A1 | | | C1 | C2 | C3 |
|---|---|---|---|---|---|
| B1 | B2 | B3 | | | |
| | | | | | |
| | | | | | |
| | | | | | |
| | | | | | |
| | | | | | |
| ⋮ | ⋮ | ⋮ | ⋮ | ⋮ | ⋮ |
| | | | | | |

RIDER-ASSISTANCE SYSTEM, DATA STRUCTURE, AND CONTROL METHOD

BACKGROUND

The present disclosure relates to a rider-assistance system, a data structure, and a control method capable of improving safety of a straddle-type vehicle.

Conventionally, various techniques for assisting with driving by a rider of a straddle-type vehicle such as a motorcycle have been proposed. For example, a driver-assistance system is disclosed in JP-A-2009-116882. The driver-assistance system warns the rider of the motorcycle that the motorcycle inappropriately approaches an obstacle on the basis of information detected by a sensor device that detects the obstacle present in a travel direction or substantially in the travel direction.

SUMMARY

Here, compared to a four-wheeled automobile and the like, posture of the straddle-type vehicle tends to become unstable, and it is desired to improve safety of the straddle-type vehicle. In particular, the safety of the straddle-type vehicle is desired during turning travel thereof on a curved road due to a reason that a degree of freedom of a travel path is high, and the like.

The present invention has been made with the above-described problem as the background and therefore obtains a rider-assistance system, a data structure, and a control method capable of improving safety of a straddle-type vehicle.

A rider-assistance system according to the present invention is a rider-assistance system that assists with driving by a rider of a straddle-type vehicle, includes an execution section that executes rider-assistance operation to assist with driving by the rider, and further includes a generation section that generates travel guide information on a curved road by subjecting a data set to statistical processing, the data set including turning travel information of each of plural straddle-type vehicles on the curved road acquired for each of the vehicles. Before the straddle-type vehicle enters the curved road, the execution section executes the rider-assistance operation on the basis of the travel guide information that is generated by the generation section.

A data structure according to the present invention is a data structure used in a rider-assistance system that assists with driving by a rider of a straddle-type vehicle, and includes turning travel information of each of plural straddle-type vehicles on a curved road acquired for each of the vehicles. The turning travel information is associated with newness/oldness degree information of the turning travel information.

A control method according to the present invention is a control method for a rider-assistance system that assists with driving by a rider of a straddle-type vehicle, and includes: executing rider-assistance operation to assist with driving by the rider by an execution section of the rider-assistance system; and generating travel guide information on a curved road by a generation section of the rider-assistance system by subjecting a data set, which includes turning travel information of each of plural straddle-type vehicles on the curved road acquired by each of the vehicles, to statistical processing. Before the straddle-type vehicle enters the curved road, the execution section executes the rider-assistance operation on the basis of the travel guide information that is generated by the generation section.

In the rider-assistance system, the data structure, and the control method according to the present invention, the execution section of the rider-assistance system executes the rider-assistance operation to assist with driving by the rider. Furthermore, the generation section of the rider-assistance system generates the travel guide information on the curved road by subjecting the data set, which includes the turning travel information of each of the plural straddle-type vehicles on the curved road acquired by each of the vehicles, to the statistical processing. Before the straddle-type vehicle enters the curved road, the execution section executes the rider-assistance operation on the basis of the travel guide information that is generated by the generation section. In this way, the straddle-type vehicle can make the turning travel on the curved road by using the turning travel information, which is acquired by each of the plural straddle-type vehicles. Thus, it is possible to improve safety during the turning travel on the curved road. Therefore, it is possible to improve the safety of the straddle-type vehicle.

BRIEF DESCRIPTION OF THE DRAWINGS

FIG. 1 is a schematic view illustrating an outline configuration of a rider-assistance system according to an embodiment of the present invention.

FIG. 2 is a block diagram illustrating an exemplary functional configuration of a controller according to the embodiment of the present invention.

FIG. 3 is a block diagram illustrating an exemplary functional configuration of a server according to the embodiment of the present invention.

FIG. 4 is a flowchart illustrating an example of a processing procedure that is executed by the controller according to the embodiment of the present invention.

FIG. 5 is a schematic view illustrating a situation where a straddle-type vehicle according to the embodiment of the present invention enters a curved road from a straight road.

FIG. 6 is a flowchart illustrating an example of a processing procedure that is executed by the server according to the embodiment of the present invention.

FIG. 7 is a schematic table illustrating an outline configuration of a data set according to the embodiment of the present invention.

DETAILED DESCRIPTION

A description will hereinafter be made on a rider-assistance system, a data structure, and a control method according to the present invention with reference to the drawings.

The following description will be made on an example in which a straddle-type vehicle included in the rider-assistance system is a two-wheeled motorcycle (see a straddle-type vehicle 10 in FIG. 1). However, the straddle-type vehicle included in the rider-assistance system according to the present invention may be a straddle-type vehicle other than the two-wheeled motorcycle. The straddle-type vehicle means a vehicle that a rider straddles. Examples of the straddle-type vehicle are motorcycles (a two-wheeled motor vehicle and a three-wheeled motor vehicle) and a pedal-driven vehicle. The motorcycles include a vehicle having an engine as a power source, a vehicle having an electric motor as a power source, and the like. Examples of the motorcycles are a motorbike, a scooter, and an electric scooter. The pedal-driven vehicle means a vehicle capable of traveling forward on a road by a depression force applied to pedals by the rider. Examples of the pedal-driven vehicle are a normal pedal-driven vehicle, an electrically-assisted pedal-driven vehicle, and an electric pedal-driven vehicle.

A configuration, operation, and the like, which will be described below, merely constitute one example. The rider-assistance system, the data structure, and the control method according to the present invention are not limited to a case with such a configuration, such operation, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

<Configuration of Rider-Assistance System>

A description will be made on a configuration of a rider-assistance system 1 according to the embodiment of the present invention with reference to FIG. 1 to FIG. 3.

FIG. 1 is a schematic view illustrating an outline configuration of the rider-assistance system 1. As illustrated in FIG. 1, the rider-assistance system 1 includes the straddle-type vehicle 10 and a server 20 that are mutually communicable wirelessly via a wireless communication network N1. The straddle-type vehicle 10 is a two-wheeled motorcycle that corresponds to an example of the straddle-type vehicle according to the present invention. FIG. 1 illustrates the single straddle-type vehicle 10 to facilitate understanding. However, in reality, the plural straddle-type vehicles 10 can communicate with the server 20 via the communication network N1.

As illustrated in FIG. 1, the straddle-type vehicle 10 includes a display section 11, a navigation system 12, an inertial measurement unit (IMU) 13, a front-wheel rotational frequency sensor 14, a rear-wheel rotational frequency sensor 15, and a controller (ECU) 16.

The display section 11 has a display function of visually displaying information. Examples of the display section 11 are a liquid-crystal display and a lamp. At a position in front of a handlebar, the display section 11 is provided to a trunk of the straddle-type vehicle 10, for example. However, the arrangement of the display section 11 in relation to a vehicle body is not particularly limited.

The navigation system 12 is a system that guides the rider along a route from a current location of the straddle-type vehicle 10 to a destination desired by the rider. The navigation system 12 displays various types of information on route guidance (for example, the current location of the straddle-type vehicle 10, a travel route as a guidance target, a location of the destination, a distance on the travel route from the current location of the straddle-type vehicle 10 to the destination, a time required to arrive at the destination, and the like). In addition, the navigation system 12 can acquire location information of the straddle-type vehicle 10 on the basis of information that is sent from the Global Positioning System (GPS) satellite.

The inertial measurement unit 13 includes a three-axis gyroscope sensor and a three-directional acceleration sensor, and detects a posture of the straddle-type vehicle 10. The inertial measurement unit 13 is provided to the trunk of the straddle-type vehicle 10, for example. More specifically, the inertial measurement unit 13 detects a body lean angle of the straddle-type vehicle 10 and outputs a detection result. The inertial measurement unit 13 may detect another physical quantity that can substantially be converted to the body lean angle of the straddle-type vehicle 10. The body lean angle corresponds to an angle representing an inclination in a rolling direction of the body (more specifically, the trunk) of the straddle-type vehicle 10 with respect to an upper vertical direction.

The front-wheel rotational frequency sensor 14 is a wheel rotational frequency sensor that detects a rotational frequency of a front wheel (for example, a rotational frequency of the front wheel per unit time [rpm], a travel distance of the front wheel per unit time [km/h], or the like), and outputs a detection result. The front-wheel rotational frequency sensor 14 may detect another physical quantity that can substantially be converted to the rotational frequency of the front wheel. The front-wheel rotational frequency sensor 14 is provided to the front wheel.

The rear-wheel rotational frequency sensor 15 is a wheel rotational frequency sensor that detects a rotational frequency of a rear wheel (for example, the rotational frequency of the rear wheel per unit time [rpm], a travel distance of the rear wheel per unit time [km/h], or the like), and outputs a detection result. The rear-wheel rotational frequency sensor 15 may detect another physical quantity that can substantially be converted to the rotational frequency of the rear wheel. The rear-wheel rotational frequency sensor 15 is provided to the rear wheel.

The controller 16 controls operation of each of the devices in the straddle-type vehicle 10. For example, the controller 16 is partially or entirely constructed of a microcomputer, a microprocessor unit, or the like. In addition, the controller 16 may partially or entirely be constructed of one whose firmware and the like can be updated, or may partially or entirely be a program module or the like that is executed by a command from a CPU or the like, for example. The controller 16 may be provided as one unit or may be divided into plural units, for example.

FIG. 2 is a block diagram illustrating an exemplary functional configuration of a controller 16. As illustrated in FIG. 2, the controller 16 includes a communication section 16*a* and an execution section 16*b*, for example. The controller 16 can acquire information from the navigation system 12, the inertial measurement unit 13, the front-wheel rotational frequency sensor 14, and the rear-wheel rotational frequency sensor 15, and can output a control command to the display section 11. In the present specification, the acquisition of the information can include extraction, generation, and the like of the information.

The communication section 16*a* communicates with the server 20 via the communication network N1.

The execution section 16*b* executes rider-assistance operation. The rider-assistance operation is operation to assist with driving by the rider, and can include various types of the operation. For example, the execution section 16*b* executes, as the rider-assistance operation, notification operation to notify the rider of the various types of the information. In the notification operation, for example, the rider is notified of the information by display that is provided by the display section 11.

The server 20 in FIG. 1 collects and manages the information from the plural straddle-type vehicles 10, and sends the information used for the rider-assistance operation (more specifically, travel guide information, which will be described below) to each of the straddle-type vehicles 10. For example, the server 20 is partially or entirely constructed of a microcomputer, a microprocessor unit, or the like. In addition, the server 20 may partially or entirely be constructed of one whose firmware and the like can be updated, or may partially or entirely be a program module or the like that is executed by a command from a CPU or the like, for example. The server 20 may be provided as one unit or may be divided into plural units, for example.

FIG. 3 is a block diagram illustrating an exemplary functional configuration of the server 20. As illustrated in FIG. 3, the server 20 includes a communication section 21, a generation section 22, and a storage section 23, for example.

The communication section 21 communicates with each of the straddle-type vehicles 10 via the communication network N1. More specifically, the communication section 21 communicates with the controller 16 of each of the straddle-type vehicles 10.

The generation section 22 generates the travel guide information of a curved road on the basis of the information that is collected from the plural straddle-type vehicles 10. The travel guide information is information that guides the straddle-type vehicle 10 at the time when the straddle-type vehicle 10 turns on the curved road. As will be described below, examples of the travel guide information are a standard (for example, average) swept path at the time when the plural straddle-type vehicles 10 turn on the curved road, a standard (for example, average) vehicle speed, and the standard (for example,) body lean angle. A detailed description on the travel guide information will be made below.

The storage section 23 stores the various types of the information. For example, the storage section 23 stores the information that is received by the communication section 21. The generation section 22 generates the travel guide information on the basis of the information that is stored by the storage section 23. More specifically, the storage section 23 stores a data set that includes turning travel information of each of the plural straddle-type vehicles 10 on the curved road, and the turning travel information is acquired by each of the vehicles. The turning travel information can include various types of information on turning travel on the curved road (for example, information on the swept path in the turning travel, information on the speed in the turning travel, information on the body lean angle in the turning travel, and the like). The generation section 22 generates the travel guide information by subjecting the above data set to statistical processing. A detailed description on the data set will be made below.

<Operation of Rider-Assistance System>

A description will be made on operation of the rider-assistance system 1 according to the embodiment of the present invention with reference to FIG. 4 to FIG. 7.

In the rider-assistance system 1, the controller 16 of the straddle-type vehicle 10 and the server 20 communicate with each other, and safety is thereby improved by the rider-assistance operation. Hereinafter, a description will sequentially be made on processing executed by the controller 16 of the straddle-type vehicle 10 and processing executed by the server 20.

FIG. 4 is a flowchart illustrating an example of a processing procedure that is executed by the controller 16. Step S101 in FIG. 4 corresponds to initiation of a control flow illustrated in FIG. 4.

When the control flow illustrated in FIG. 4 is initiated, in step S102, the controller 16 determines whether the curved road (for example, the curved road that is continuously connected to a travel road on which the straddle-type vehicle 10 travels and that is located in front of the travel road) has been detected in front of the straddle-type vehicle 10.

FIG. 5 is a schematic view illustrating a situation where the straddle-type vehicle 10 enters a curved road R2 from a straight road R1. In the example illustrated in FIG. 5, the curved road R2 is continuously connected to the straight road R1, on which the straddle-type vehicle 10 travels, and is located in front of the straight road R1. The controller 16 can detect the curved road R2 in front of the straddle-type vehicle 10 when the straddle-type vehicle 10 travels on the straight road R1. For example, the controller 16 can detect the curved road R2 on the basis of the information (for example, map information and the location information of the straddle-type vehicle 10) that is acquired from the navigation system 12.

In the case where the straddle-type vehicle 10 is provided with a surrounding environment sensor, the controller 16 may detect the curved road R2 on the basis of an output result of the surrounding environment sensor. Surrounding environment information that is detected by the surrounding environment sensor may be information on a distance to or an orientation of a target object that is located around the straddle-type vehicle 10 (for example, a relative location, a relative distance, a relative speed, relative acceleration, or the like), or may be a characteristic of the target object that is located around the straddle-type vehicle 10 (for example, a type of the target object, a shape of the target object itself, a mark on the target object, or the like). Examples of the surrounding environment sensor are a radar, a Lidar sensor, an ultrasonic sensor, and a camera.

If the curved road has not been detected in front of the straddle-type vehicle 10 (step S102/NO), the processing in step S102 is repeated. On the other hand, if the curved road R2 has been detected in front of the straddle-type vehicle 10 (step S102/YES), the processing proceeds to step S103.

If it is determined YES in step S102, in step S103, the communication section 16*a* of the controller 16 sends, to the server 20, a sending request that is a command to request the server 20 to send the travel guide information. In this way, as will be described below, the server 20 generates the travel guide information and sends the generated travel guide information to the controller 16. Then, after step S103, in step S104, the communication section 16*a* of the controller 16 receives the travel guide information. For example, the communication section 16*a* receives, as the travel guide information, the information on the standard swept path (for example, a trajectory T1 illustrated in FIG. 5) at the time when the plural straddle-type vehicles 10 turn on the curved road R2. However, the travel guide information can include the various types of the information other than the information on the swept path.

After step S104, in step S105, the execution section 16*b* of the controller 16 executes, as the rider-assistance operation, the notification operation to notify the rider of the travel guide information, and the processing returns to step S102. The detailed description on the travel guide information will be made below.

FIG. 6 is a flowchart illustrating an example of a processing procedure that is executed by the server 20. Step S201 in FIG. 6 corresponds to initiation of the control flow illustrated in FIG. 6.

When the control flow illustrated in FIG. 6 is initiated, in step S202, the server 20 determines whether the communication section 21 has received the sending request for the travel guide information, which has been sent from the communication section 16*a* of the controller 16 in step S103 in the control flow illustrated in FIG. 4 described above.

If it is determined that the communication section 21 has not received the sending request for the travel guide information (step S202/NO), the processing in step S202 is repeated. On the other hand, if it is determined that the communication section 21 has received the sending request for the travel guide information (step S202/YES), the processing proceeds to step S203.

If it is determined YES in step S202, in step S203, the generation section 22 of the server 20 generates the travel guide information. Here, the generation section 22 generates the travel guide information by subjecting the data set, which includes the turning travel information of each of the plural straddle-type vehicles 10 on the curved road R2 acquired by each of the vehicles, to the statistical processing.

FIG. 7 is a schematic table illustrating an outline configuration of a data set D1. In the example illustrated in FIG. 7, the data set D1 has a data structure in a data table format in which information in columns are associated with each other in each row. However, the data set D1 may have the structure in the format other than the data table format.

In the example illustrated in FIG. 7, the information in each of the rows in the data set D1 corresponds to the information that is acquired by the respective straddle-type vehicle 10. That is, the information in the one row in the data set D1 corresponds to the information that is acquired by the single straddle-type vehicle 10 for the single turning travel.

The information in a column A1 in the data set D1 is the turning travel information. The turning travel information is the information that is acquired by each of the straddle-type vehicles 10 when the respective straddle-type vehicle 10 turns on the curved road R2. Each of the straddle-type vehicles 10 sends the acquired turning travel information to the server 20. The turning travel information may be sent to the server 20 as needed, for example. The turning travel information may be sent to the server 20 after the travel of the straddle-type vehicle 10 is terminated (for example, when an engine is stopped). The server 20 incorporates and stores the received turning travel information into the data set D1.

In the example illustrated in FIG. 7, the column A1 is divided into a column B1, a column B2, and a column B3. The information in the column B1 is the information on the swept path of the turning travel information. In each of the straddle-type vehicles 10, the information on the swept path is acquired on the basis of the location information that is acquired from the navigation system 12, for example. The information in the column B2 is the information on the vehicle speed of the turning travel information. In each of the straddle-type vehicles 10, the information on the vehicle speed is acquired on the basis of the output results of the front-wheel rotational frequency sensor 14 and the rear-wheel rotational frequency sensor 15, for example. The information in the column B3 is the information on the body lean angle of the turning travel information. In each of the straddle-type vehicles 10, the information on the body lean angle is acquired on the basis of the output result of the inertial measurement unit 13, for example.

Information in each of a column C1, a column C2, and a column C3 in the data set D1 is a parameter that is associated with the turning travel information. When turning on the curved road R2, each of the straddle-type vehicles 10 acquires the parameter, which is associated with the turning travel information, in addition to the turning travel information. When sending the turning travel information, each of the straddle-type vehicles 10 also sends, to the server 20, the parameter, which is associated with the turning travel information, in addition to the acquired turning travel information. The server 20 associates the received parameter with the turning travel information, and incorporates and stores the parameter into the data set D1.

The information in the column C1 is newness/oldness degree information of the turning travel information. The newness/oldness degree information is information on a degree of newness of the associated turning travel information. For example, the newness/oldness degree information is information on a date and time at which the associated turning travel information is acquired. That is, the newness/oldness degree information is information on the degree of newness/oldness of the turning travel information, or information used to determine the degree of newness/oldness of the turning travel information.

The information in the column C2 is environment information. The environmental information is information on external environment of the straddle-type vehicle 10.

For example, the environment information can include road surface information, weather information, seasonal information, time of day information, brightness information, temperature information, humidity information, and the like. Examples of the road surface information are information on a crack of the road surface, information on a dent of the road surface, and information on an obstacle (for example, a tree branch, a leaf, or the like) on the road surface. An example of the time of day information is information on whether current time is morning, noon, evening, or night. An example of the brightness information is information on brightness around of the straddle-type vehicle 10.

Information in the column C3 is the vehicle information. The vehicle information is information on the straddle-type vehicle 10 itself.

For example, the vehicle information can include model information, displacement information, occupant state information, baggage information, and the like. The occupant state information is information on a state of an occupant riding in the straddle-type vehicle 10. Examples of the occupant state information are information on the number of the occupants and information on weight of the occupants. The baggage information is information on baggage carried on the straddle-type vehicle 10. Examples of the baggage information are information on presence or absence of the baggage, information on the number of pieces of baggage, and information on weight of the baggage.

As described above, in step S203, the generation section 22 generates the travel guide information by subjecting the data set D1 to the statistical processing. Here, in order to appropriately generate, as the travel guide information, information that serves as a guide at the time when the straddle-type vehicle 10 as a sending source of the sending request for the travel guide information turns on the curved road R2, the generation section 22 executes the statistical processing by using the parameter that is associated with the turning travel information.

The statistical processing, to which the data set D1 is subjected, include processing (hereinafter also referred to as extraction processing) to extract the turning travel information from the data set D1 on the basis of the parameter, for example. In this case, for example, the generation section 22 extracts the turning travel information that is associated with the parameter in the data set D1, and the parameter is associated with the straddle-type vehicle 10 as the sending source of the sending request for the travel guide information.

For example, the generation section 22 extracts the turning travel information that is associated with the newness/oldness degree information in the data set D1, and the newness/oldness degree information is associated with a time point at which the straddle-type vehicle 10 as the sending source of the sending request sends the sending request for the travel guide information. In addition, for example, the generation section 22 extracts the turning travel information (the information in the column A1) in the row in which the newness/oldness degree information is included in the column C1, and the newness/oldness degree information indicates that the turning travel information is acquired in a specified period from the time point at which the straddle-type vehicle 10 as the sending source of the sending request sends the sending request for the travel guide information as a start point.

For example, the generation section 22 extracts the turning travel information that is associated with the environment information in the data set D1, and the environment information matches the environment information that is associated with the straddle-type vehicle 10 as the sending source of the sending request. For example, in the case where the weather information that is associated with the straddle-type vehicle 10 as the sending source of the sending request is information on a sunny day, the generation section 22 extracts the turning travel information (the information in the column A1) in the row in which the information on the sunny day is included in the column C2.

For example, the generation section 22 extracts the turning travel information that is associated with the vehicle information in the data set D1, and the vehicle information matches the vehicle information that is associated with the straddle-type vehicle 10 as the sending source of the sending request. For example, the generation section 22 extracts the turning travel information (the information in the column A1) in the row in which the model information on the same model as a model of the straddle-type vehicle 10 as the sending source of the sending request is included in the column C3.

In step S203, the generation section 22 generates, as the travel guide information, an average value of the turning travel information (the information in the column A1) that is extracted from the data set D1 by the extraction processing, for example. In this case, the average value of the information in the column B1, which is extracted by the above extraction processing, corresponds to the average swept path at the time when the plural straddle-type vehicles 10 turn on the curved road R2. The average value of the information in the column B2, which is extracted by the above extraction processing, corresponds to the average vehicle speed at the time when the plural straddle-type vehicles 10 turn on the curved road R2. The average value of the information in the column B3, which is extracted by the above extraction processing, corresponds to the average body lean angle at the time when the plural straddle-type vehicles 10 turn on the curved road R2.

Here, in the extraction processing, the turning travel information may be extracted on the basis of only one of the newness/oldness degree information (the information in the column C1), the environment information (the information in the column C2), and the vehicle information (the information in the column C3), the turning travel information may be extracted on the basis of two of the newness/oldness degree information (the information in the column C1), the environment information (the information in the column C2), and the vehicle information (the information in the column C3), or the turning travel information may be extracted on the basis of all of the newness/oldness degree information (the information in the column C1), the environment information (the information in the column C2), and the vehicle information (the information in the column C3).

Here, the statistical processing, to which the data set D1 is subjected, may include processing (hereinafter also referred to as weighting processing) to weight the data set D1 on the basis of the parameter. In this case, for example, the generation section 22 calculates a weighting average such that weight of the turning travel information, which is associated with, in the data set D1, the parameter associated with the straddle-type vehicle 10 as the sending source of the sending request for the travel guide information, is heavier than weight of the other turning travel information.

For example, in the extraction processing, in the case where the turning travel information is not extracted on the basis of the newness/oldness degree information (the information in the column C1), the generation section 22 weights the turning travel information (the information in the column A1), which is extracted from the data set D1 by the extraction processing, on the basis of the newness/oldness degree information (the information in the column C1). In this case, for example, the generation section 22 calculates a weighting average by increasing weight of the turning travel information (the information in the column A1) in the row in which the newness/oldness degree information is included in the column C1, and the newness/oldness degree information indicates that the turning travel information is acquired in the specified period from the time point at which the straddle-type vehicle 10 as the sending source of the sending request sends the sending request for the travel guide information as the start point.

In addition, for example, in the extraction processing, in the case where the turning travel information is not extracted on the basis of the environment information (the information in the column C2), the generation section 22 weights the turning travel information (the information in the column A1), which is extracted from the data set D1 by the extraction processing, on the basis of the environment information (the information in the column C2). In this case, for example, in the case where the weather information that is associated with the straddle-type vehicle 10 as the sending source of the sending request is the information on the sunny day, the generation section 22 calculates the weighting average by increasing the weight of the turning travel information (the information in the column A1) in the row in which the information on the sunny day is included in the column C2.

Furthermore, for example, in the extraction processing, in the case where the turning travel information is not extracted on the basis of the vehicle information (the information in the column C3), the generation section 22 weights the turning travel information (the information in the column A1), which is extracted from the data set D1 by the extraction processing, on the basis of the vehicle information (the information in the column C3). In this case, for example, the generation section 22 calculates the weighting average by increasing the weight of the turning travel information (the information in the column A1) in the row in which the model information on the same model as the model of the straddle-type vehicle 10 as the sending source of the sending request is included in the column C3.

As described above, by executing the weighting processing in addition to the extraction processing, it is possible to generate, as the travel guide information, the weighting average of the turning travel information (the information in the column A1), which is extracted from the data set D1 by the extraction processing. The weighting average of the column B1, which is acquired by executing the weighting processing after the extraction processing, corresponds to the standard swept path at the time when the plural straddle-type vehicles 10 turn on the curved road R2. The weighting average of the column B2, which is acquired by executing the weighting processing after the extraction processing, corresponds to the standard vehicle speed at the time when the plural straddle-type vehicles 10 turn on the curved road R2. The weighting average of the column B3, which is acquired by executing the weighting processing after the extraction processing, corresponds to the standard body lean angle at the time when the plural straddle-type vehicles 10 turn on the curved road R2.

The above description has been made on the example in which the travel guide information is generated by executing the extraction processing without executing the weighting processing (more specifically, the example in which the average value of the turning travel information extracted by the extraction processing is generated as the travel guide information) and the example in which the travel guide information is generated by executing the weighting processing in addition to the extraction processing (more specifically, the example in which the weighting average of the turning travel information acquired by the weighting processing is generated as the travel guide information). However, the travel guide information may be generated by executing the weighting processing without executing the extraction processing.

After step S203 in FIG. 6, in step S204, the communication section 21 of the server 20 sends the travel guide information, which is generated in step S203, to the controller 16, and the processing returns to step S202.

When the travel guide information is sent to the controller 16 in step S204, as described above, the execution section 16*b* of the controller 16 executes, as the rider-assistance operation, the notification operation to notify the rider of the travel guide information.

For example, in the notification operation, the execution section 16*b* causes the display section 11 to display the standard (for example, average) swept path at the time when the plural straddle-type vehicles 10 turn on the curved road R2. In this case, for example, the execution section 16*b* causes the display section 11 to display an image in which a line indicating the standard swept path is superimposed on an object indicating the curved road R2.

For example, in the notification operation, the execution section 16*b* causes the display section 11 to display the standard (for example, average) vehicle speed at the time when the plural straddle-type vehicles 10 turn on the curved road R2. In this case, for example, the execution section 16*b* causes the display section 11 to display an image in which a number indicating the standard vehicle speed is superimposed on the object indicating the curve road R2.

For example, in the notification operation, the execution section 16*b* causes the display section 11 to display the standard (for example, average) body lean angle at the time when the plural straddle-type vehicles 10 turn on the curved road R2. In this case, for example, the execution section 16*b* causes the display section 11 to display an image in which a number indicating the standard body lean angle is superimposed on the object indicating the curved road R2.

In the notification operation, the execution section 16*b* may further notify of information other than the information described above. For example, the execution section 16*b* may cause the display section 11 to display an image in which an object indicating the obstacle, a white line, a joint of the road, or the like is further superimposed on the object indicating the curved road R2.

As it has been described so far, in the rider-assistance system 1, the generation section 22 generates the travel guide information by subjecting the data set D1, which includes the turning travel information of the plural straddle-type vehicles 10 on the curved road R2 acquired by each of the vehicles, to the statistical processing. Then, the execution section 16*b* executes the rider-assistance operation on the basis of the travel guide information generated by the generation section 22. In this way, the straddle-type vehicle 10 can turn on the curved road R2 by using the turning travel information, which is acquired by each of the plural straddle-type vehicles 10. Thus, it is possible to improve the safety during the turning travel on the curved road R2. Therefore, it is possible to improve the safety of the straddle-type vehicle 10.

The above description has been made on the example in which the notification operation to notify the rider of the travel guide information is executed as the rider-assistance operation. However, the execution section 16*b* only needs to execute the rider-assistance operation on the basis of the travel guide information, and operation other than the above notification operation is executed as the rider-assistance operation. For example, in the case where the vehicle speed of the straddle-type vehicle 10 as an own vehicle exceeds the standard vehicle speed at the time when the plural straddle-type vehicles 10 turn on the curved road R2, the execution section 16*b* may execute, as the rider-assistance operation, operation to turn on or blink the lamp.

The above description has been made on the processing executed by the controller 16 of the straddle-type vehicle 10 and the processing executed by the server 20 with reference to the flowcharts in FIG. 4 and FIG. 6. However, the processing executed in the rider-assistance system 1 is not limited to the above processing examples.

For example, the processing that is executed by the controller 16 in the above example may partially be executed by the server 20, or the processing that is executed by the server 20 in the above example may partially be executed by the controller 16. For example, the processing that is executed by the generation section 22 of the server 20 may be executed by the controller 16. In this case, the server 20 sends the data set D1 to the controller 16, and the controller 16 generates the travel guide information on the basis of the received data set D1.

For example, the controller 16 may additionally execute processing other than the processing illustrated in FIG. 4. For example, before step S102 in FIG. 4, the controller 16 may determine whether the information such as the map information and the location information of the straddle-type vehicle 10 can be acquired successfully from the navigation system 12. If it is determined that the information cannot be acquired successfully from the navigation system 12, the controller 16 may notify the rider of the result of this determination. Alternatively, for example, before step S102 in FIG. 4, the controller 16 may determine whether the communication with the server 20 can be established normally. If it is determined that the communication with the server 20 cannot be established normally, the controller 16 may notify the rider of the result of this determination. Alternatively, for example, after step S103 in FIG. 4, the controller 16 may determine whether the travel guide information has been received successfully from the server 20. If it is determined that the travel guide information has not been received successfully from the server 20, the controller 16 may notify the rider of the result of this determination.

<Effects of Rider-Assistance System>

A description will be made on effects of the rider-assistance system 1 according to the embodiment of the present invention.

In the rider-assistance system 1, the generation section 22 generates the travel guide information by subjecting the data set D1, which includes the turning travel information of each of the plural straddle-type vehicles 10 on the curved road R2 acquired by each of the vehicles, to the statistical processing. Then, the execution section 16*b* executes the rider-assistance operation on the basis of the travel guide information generated by the generation section 22. In this way, the straddle-type vehicle 10 can turn on the curved road R2 by using the turning travel information, which is acquired by each of the plural straddle-type vehicles 10. Thus, it is possible to improve the safety during the turning travel on the curved road R2. Therefore, it is possible to improve the safety of the straddle-type vehicle 10.

Preferably, in rider-assistance system 1, the statistical processing includes processing to extract the turning travel information on the basis of the parameter from the data set D1. In this way, it is possible to appropriately generate the travel guide information that is suited for the straddle-type vehicle 10 as the sending source of the sending request for the travel guide information. Therefore, it is possible to appropriately improve the safety of the straddle-type vehicle 10 during the turning travel on the curved road R2.

Preferably, in rider-assistance system 1, the statistical processing includes processing to weight the data set D1 on the basis of the parameter. In this way, it is possible to appropriately generate the travel guide information that is suited for the straddle-type vehicle 10 as the sending source of the sending request for the travel guide information. Therefore, it is possible to appropriately improve the safety of the straddle-type vehicle 10 during the turning travel on the curved road R2.

Preferably, in the rider-assistance system 1, the parameter includes the newness/oldness degree information of the turning travel information. In this way, it is possible to appropriately generate the travel guide information that is suited for the straddle-type vehicle 10 as the sending source of the sending request on the basis of the time point at which the straddle-type vehicle 10 as the sending source of the sending request sends the sending request for the travel guide information. Therefore, it is possible to further appropriately improve the safety of the straddle-type vehicle 10 during the turning travel on the curved road R2.

Preferably, in the rider-assistance system 1, the parameter includes the environment information. In this way, it is possible to appropriately generate the travel guide information that is suited for the straddle-type vehicle 10 as the sending source of the sending request on the basis of the environment information that is associated with the straddle-type vehicle 10 as the sending source of the sending request. Therefore, it is possible to further appropriately improve the safety of the straddle-type vehicle 10 during the turning travel on the curved road R2.

Preferably, in the rider-assistance system 1, the parameter includes the vehicle information. In this way, it is possible to appropriately generate the travel guide information that is suited for the straddle-type vehicle 10 as the sending source of the sending request on the basis of the vehicle information that is associated with the straddle-type vehicle 10 as the sending source of the sending request. Therefore, it is possible to further appropriately improve the safety of the straddle-type vehicle 10 during the turning travel on the curved road R2.

Preferably, in the rider-assistance system 1, the travel guide information includes the information on the swept path. In this way, the execution section 16*b* can execute the rider-assistance operation on the basis of the information on the swept path that serves as the guide at the time when the straddle-type vehicle 10 as the sending source of the sending request turns on the curved road R2 (for example, the information on the standard swept path at the time when the plural straddle-type vehicles 10 turn on the curved road R2). Therefore, it is possible to appropriately improve the safety of the straddle-type vehicle 10 during the turning travel on the curved road R2.

Preferably, in the rider-assistance system 1, the travel guide information includes the information on the vehicle speed. In this way, the execution section 16*b* can execute the rider-assistance operation on the basis of the information on the vehicle speed that serves as the guide at the time when the straddle-type vehicle 10 as the sending source of the sending request turns on the curved road R2 (for example, the information on the standard vehicle speed at the time when the plural straddle-type vehicles 10 turn on the curved road R2). Therefore, it is possible to appropriately improve the safety of the straddle-type vehicle 10 during the turning travel on the curved road R2.

Preferably, in the rider-assistance system 1, the travel guide information includes the information on the body lean angle. In this way, the execution section 16*b* can execute the rider-assistance operation on the basis of the information on the body lean angle that serves as the guide at the time when the straddle-type vehicle 10 as the sending source of the sending request turns on the curved road R2 (for example, the information on the standard body lean angle at the time when the plural straddle-type vehicles 10 turn on the curved road R2). Therefore, it is possible to appropriately improve the safety of the straddle-type vehicle 10 during the turning travel on the curved road R2.

Preferably, in the rider-assistance system 1, the rider-assistance operation is operation to notify the rider of the travel guide information. In this way, it is possible to notify the rider of the information, such as the information on the swept path, the information on the vehicle speed, or the information on the body lean angle, that serves as the guide at the time when the straddle-type vehicle 10 as the sending source of the sending request turns on the curved road R2. Therefore, it is possible to appropriately improve the safety of the straddle-type vehicle 10 during the turning travel on the curved road R2.

Preferably, in the rider-assistance system 1, the data structure (in the above example, the data set D1) used in the rider-assistance system 1 that assists with driving by the rider of the straddle-type vehicle 10 includes the turning travel information of each of the plural straddle-type vehicles 10 on the curved road R2 acquired by each of the vehicles, and the turning travel information is associated with the newness/oldness degree information of the turning travel information. In this way, the straddle-type vehicle 10 can turn on the curved road R2 by using the turning travel information, which is acquired by each of the plural straddle-type vehicles 10. Thus, it is possible to improve the safety during the turning travel on the curved road R2. In particular, it is possible to appropriately generate the travel guide information that is suited for the straddle-type vehicle 10 as the sending source of the sending request on the basis of the time point at which the straddle-type vehicle 10 as the sending source of the sending request sends the sending request for the travel guide information. Therefore, it is possible to improve the safety of the straddle-type vehicle 10.

Preferably, in the rider-assistance system 1, the turning travel information is associated with at least one of the environment information and the vehicle information in the data structure (in the above example, the data set D1). In this way, it is possible to appropriately generate the travel guide information that is suited for the straddle-type vehicle 10 as the sending source of the sending request on the basis of at least one of the environment information and the vehicle information that are associated with the straddle-type vehicle 10 as the sending source of the sending request. Therefore, it is possible to further appropriately improve the safety of the straddle-type vehicle 10 during the turning travel on the curved road R2.

The present invention is not limited to the embodiment that has been described. For example, only a part of the embodiment may be implemented.

REFERENCE SIGNS LIST

1: Rider-assistance system
10: Straddle-type vehicle
11: Display section
12: Navigation device
13: Inertial measurement unit
14: Front-wheel rotational frequency sensor
15: Rear-wheel rotational frequency sensor
16: Controller
16*a*: Communication section
16*b*: Execution section
20: Server
21: Communication section
22: Generation section
23: Storage section
A1: Column
B1: Column
B2: Column
B3: Column
C1: Column
C2: Column
C3: Column
D1: Data set
N1: Communication network
R1: Straight road
R2: Curved road

The invention claimed is:

1. A rider-assistance system (1) for assisting a rider in driving a straddle-type vehicle (10), the rider-assistance system comprising:

an electronic controller (16) configured to execute a rider-assistance operation to assist with driving by the rider, and further configured to:

generate travel guide information on a curved road (R2) by performing a process of extracting turning travel information based on a parameter from a dataset (D1) including turning travel information on the curved road (R2) acquired by each of plural straddle-type vehicles (10) on the curved road (R2) and/or weighting the dataset (D1) on the basis of the parameter, wherein before the straddle-type vehicle (10) enters the curved road (R2), the electronic controller (16) executes the rider-assistance operation based on the travel guide information that is generated by the electronic controller (16), wherein the parameter includes newness/oldness degree information of the turning travel information, and the travel guide information includes information on a swept path.

2. The rider-assistance system according to claim 1, wherein the parameter includes environment information.

3. The rider-assistance system according to claim 1, wherein the parameter includes vehicle information.

4. The rider-assistance system according to claim 1, wherein the travel guide information includes information on a vehicle speed.

5. The rider-assistance system according to claim 1, wherein the travel guide information includes information on a body lean angle.

6. The rider-assistance system according to claim 1, wherein the rider-assistance operation is operation to inform the rider of the travel guide information.

7. A control method for a rider-assistance system (1) that assists with driving by a rider of a straddle-type vehicle (10), the control method comprising:

executing, via an electronic controller (16), a rider-assistance operation to assist with driving by the rider, and further comprising:

generating, via the electronic controller (16), travel guide information on a curved road (R2) by performing a process of extracting turning travel information based on a parameter from a dataset (D1) including turning travel information on the curved road (R2) acquired by each of plural straddle-type vehicles (10) on the curved road (R2) and/or weighting the dataset (D1) on the basis of the parameter, wherein before the straddle-type vehicle (10) enters the curved road (R2), the electronic controller (16) executes the rider-assistance operation based on the travel guide information that is generated by the electronic controller (16), wherein the parameter includes newness/oldness degree information of the turning travel information, and the turning travel information includes information on a swept path.

* * * * *